United States Patent [19]

DeJongh et al.

[11] Patent Number: 4,728,465
[45] Date of Patent: Mar. 1, 1988

[54] NICKELBORIDE-POLYMER CATALYST USED IN HYDROGENATION OF FATTY COMPOUNDS

[75] Inventors: Rudolph O. DeJongh, The Hague; Cornelis VanDijk, Zwijndreacht, both of Netherlands

[73] Assignee: Internationale Octrooi Maatschappij*, Rotterdam, Netherlands

[21] Appl. No.: 821,977

[22] Filed: Jan. 24, 1986

Related U.S. Application Data

[62] Division of Ser. No. 722,383, Apr. 12, 1985, Pat. No. 4,600,701.

[30] Foreign Application Priority Data

Apr. 19, 1984 [NL] Netherlands ............... 8401301

[51] Int. Cl.$^4$ ................................. C11C 3/12
[52] U.S. Cl. .................... 260/409; 260/410.7; 260/413; 502/159
[58] Field of Search ............... 260/409; 502/159

[56] References Cited

U.S. PATENT DOCUMENTS

| | | | |
|---|---|---|---|
| 3,392,059 | 7/1968 | May | 502/207 X |
| 4,327,235 | 4/1982 | Nakao et al. | 585/270 |
| 4,339,345 | 7/1982 | Nakao et al. | 502/207 X |
| 4,398,039 | 8/1983 | Pesa et al. | 560/265 |
| 4,424,163 | 1/1984 | Rosen | 260/409 |

*Primary Examiner*—Howard T. Mars
*Assistant Examiner*—Vera C. Clarke
*Attorney, Agent, or Firm*—Cushman, Darby & Cushman

[57] ABSTRACT

The invention provides a novel, active hydrogenation catalyst comprising nickelboride stabilized with a vinylpyrrolidone group containing polymer, said catalyst satisfies a certain activity test in the hydrogenation of soybean oil. The invention further provides a method for the preparation of said catalyst involving the use of a nickel salt contaiing less than 6, preferably less than 5 molecules of crystal water.

7 Claims, No Drawings

NICKELBORIDE-POLYMER CATALYST USED IN HYDROGENATION OF FATTY COMPOUNDS

This is a division of application Ser. No. 722,383, filed Apr. 12, 1985, now U.S. Pat. No. 4,600,701.

The invention relates to hydrogenation catalysts, more particularly the invention relates to very finely dispersed nickelboride catalysts which are stabilised with an organic linear polymer, and the use of the catalyst. Such catalysts are already known in the art. For instance, European patent (EP-B) 8407 (Pharmaceutische Fabrik Heyl) describes colloidal metal catalysts of the elements of the 8th sub-group of the periodic system which are incorporated in a solution of a linear polymer. Example 22 describes a nickel catalyst stabilised with polyvinylpyrrolidone; propanol is used as the solvent. Nickel chloride hexahydrate is used as the starting material. This catalyst is used in the hydrogenation of "Becel oil".

U.S. Pat. No. 4,327,235 describes colloidal nickel boride catalysts, stabilised in alcohol with polyvinylpyrrolidone, and the use thereof in the hydrogenation of unsaturated compounds having a double bond attached to a tertiary carbon atom. This double bond is hydrogenated without any other double bonds being affected.

The present invention now provides a very active colloidal nickelboride catalyst which has been stabilised with a linear organic polymer, this catalyst being prepared with a nickel salt which contains less than 6 mol of crystal water. Preferably a nickel halogenide is used, such as nickel chloride with 4 or less molecules of crystal water, particularly nickel chloride dihydrate; also the tetrahydrate can be used. Other salts, e.g. nickel acetate, can also be used if they contain non-reducible anions and not more than 5 molecules of crystal water. Anhydrous salts can also be used; however, their rate of dissolution is often low and they are less easily accessible.

The catalyst made herefrom is very active and very stable. The catalyst is excellent for use in the hydrogenation of unsaturated compounds, in particular fatty compounds such as triglycerides. During hydrogenation of such triglycerides the very high activity is striking, particularly at low temperatures, and the high selectivity is also noteworthy because little triglyceride with only saturated fatty acid residue is formed (low percentages of solids are determined by n.m.r. at 30° and 35° C.), and the remaining unsaturated bonds have primarily a cis-configuration.

It is preferable to disperse this catalyst in oil, e.g. a triglyceride. Preferably the nickelboride is very finely dispersed with the triglyceride and the average particle size is between 0.5 and 10, preferably between 1 and 5 nanometres. The amount of linear organic polymer in the oil suspension of the catalyst is usually between 0.5 and 5% by weight and the amount of nickelboride, calculated as nickel, is between 0.1 and 5% by weight. In the catalyst system the atomic ratio of boron to nickel is between 1 and 3:1.

A polar linear polymer containing vinylpyrrolidone groups is normally used. It is possible to use vinylalcohol and vinylacetate, containing polymers or co-polymers; polyvinylpyrrolidone is preferred. The average molecular weight of the polymer used is preferably between 10,000 and 250,000. In the case of polyvinylpyrrolidone, preferably material with an average molecular weight range of 30,000 and 60,000 is used.

The catalyst is prepared in a solvent, usually in a volatile polar solvent such as a $C_1$-$C_3$ alkanol. Preferably ethanol is be used.

The catalyst according to the invention can be made by adding a solution or suspension of alkali borohydride (preferably $NaBH_4$) to a solution or suspension of the nickel salt in an atomic ratio B:Ni=(1.5-3):1, at least one of the solutions containing the linear organic polymer dissolved therein. The addition is made in a hydrogen or inert gas atmosphere at a temperature of between 0° and 80° C., preferably between 20° and 60° C., leading to the formation of very finely dispersed nickelboride.

On completion of this reaction oil is added to the system. After addition of the oil, the solvent is removed, for instance by vacuum distillation at a temperature between 15° and 50° C., with stirring. As a result, few or no side-reactions, such as alcoholysis, occur during hydrogenation.

The oil in which the catalyst is suspended is preferably liquid at room temperature (20° C.) and an unsaturated triglyceride oil, e.g. soybean oil, is preferably used.

The invention also comprises a process for hydrogenating unsaturated fatty compounds derived from $C_{10}$-$C_{24}$ carboxylic acids, particularly triglycerides, fatty acid methylesters and nitriles, using a dispersed nickelboride catalyst prepared from a suitable nickel salt containing little or no crystal water, stabilised with a linear organic polymer.

Between 5 and 500 ppm, preferably between 5 and 200 ppm, nickel is usually added in the form of nickelboride (ppm equals here mg Ni per kg unsaturated compound). The hydrogen pressure is between 100 and 5000 kPa and the reaction mixture is stirred. The hydrogenation temperature is between 20 Ⓡ and 180° C. On completion of the hydrogenation, the catalyst and polymer are removed, partly by filtration and/or by washing with a dilute acid solution, e.g. citric acid, and, if necessary, by treating the oil with bleaching earth.

The present invention accordingly provides novel and very active hydrogenation catalysts comprising finely divided nickelboride stabilised with a linear polymer containing pyrrolidone groups, which catalysts are characterised in that with said catalyst neutralised, bleached and deodorised soybean oil with an iodine value of between 130 and 135 can be hydrogenated in a 0.3 litre Magnedrive autoclave (ex Autoclave Engineers Inc., Penna, USA) at 110° C. and 500 kPa hydrogen pressure with a head space of 50% of the capacity and a stirring rate of 750 r.p.m. with 50 ppm of nickel (calculated as metal) to a decrease in iodine value of the soybean oil of 35 units in less than 40 minutes.

More in particular the present invention provides a catalyst, characterised by the feature that the rate of iodine value decrease is at least 1 unit in iodine value per minute if the hydrogenation is carried out as described in the previous paragraph.

The rate of hydrogenation (iodine value decrease) per minute can be monitored conveniently by observing the refractive index of the oil and/or by following the consumption of hydrogen so as to determine the proper end point.

The invention will now be illustrated by way of Example.

EXAMPLE 1

The catalyst was prepared in a Schlenk reactor which was connected to a gas burette. 2.5 Millimol $NiCl_2.6H_2O$ were first heated at 55° C. for 30 minutes under vacuum by an oil pump. The green hexahydrate was thereby converted to golden-yellow dihydrate. The formation of dihydrate was confirmed by the weight loss. 34 ml Commercial absolute ethanol and 240 mg polyvinylpyrrolidone (average molecular weight 90,000) were then added to the reactor. The reactor was then connected to the gas burette. An absolute ethanol solution (16 ml) containing 6.9 millimol $NaBH_4$ was added to the resulting homogeneous solution. This addition took place at room temperature and in a hydrogen atmosphere and resulted in the formation of nickelboride as a brownish-black colloidal solution. The reaction showed an induction period of 1–2 seconds and was completed in 30 minutes. The colloidal nickelboride solution thus prepared contained 0.3% nickelboride, calculated as nickel. 15% By weight of soybean oil was added to the nickelboride solution thus prepared and the ethanol was evaporated under reduced pressure at approx. 20° C., with stirring. The resulting nickelboride dispersion in oil was found to be a particularly active hydrogenation catalyst, and after three months' storage at room temperature did not show any significant loss of activity.

For comparison, the catalyst preparation was repeated with the same quantities of reactants; the $NiCl_2 6H_2O$, however, was not dehydrated.

EXAMPLE 2

The catalysts, suspended in soybean oil as described in Example 1, were compared as to their catalytic activities. 150 g Soybean oil (iodine value 133) was hydrogenated at 110° C. and 500 kPa hydrogen pressure in an autoclave having a capacity of 0.3 l (ex Magnedrive, Erie, Penna, USA), stirred at 750 rpm. With an input of 50 ppm Ni of the PVP nickelboride catalyst, prepared from hexahydrate according to Example 1, an iodine value of 98 was reached in 64 minutes. Under the same conditions an iodine value of 96 was reached in only 21 minutes with the catalyst prepared from the nickel chloride dihydrate of Example 1. These times of hydrogenation show that the latter catalyst is considerably more active.

Under the same reaction conditions soybean oil (iodine value 133) was hydrogenated with a nickel-on-kieselguhr catalyst. With a nickel load of 200 ppm an iodine value of 98 was reached in 70 minutes. The nickel-on-kieselguhr catalyst, which contained 45% nickel, had a fish oil activity of 160% as compared with 100% for a commercially nickel-on-kieselguhr catalyst (Pricat 9900 ex Unichema, Emmerich, Germany).

EXAMPLE 3

In the same manner as described in Example 1 a nickel boride catalyst containing 1.2% nickel was prepared from 40 millimol $NiCl_2.2H_2O$ and 4 g polyvinylpyrrolidone lidone (average molecular weight 40,000), suspended in 40 ml ethanol, and 3.8 g $NaBH_4$, suspended in 160 ml absolute ethanol.

EXAMPLE 4

Soybean oil (iodine value 133) was hydrogenated as described in Example 2 with the catalyst according to Example 3. Hydrogenation with 50 ppm Ni yielded an iodine value of 97 in only 30 minutes.

EXAMPLE 5

Part of the catalyst according to Example 3 was dispersed in a sufficient amount of soybean oil (iodine value 133) to yield a nickel content of 2% after the alcohol had been removed under vacuum, as described in Example 1.

EXAMPLE 6

In a hydrogenation reactor fitted with an external cooling system and a circulation pump, 80 kg soybean oil (iodine value 133) was hydrogenated with the catalyst as described in Example 5. With 15 ppm Ni, at a temperature of 150° C. and a hydrogen pressure of 600 kPa, an iodine value of 97 was reached in 90 minutes. The hydrogenated product had a slip melting point of 33° C. The solids content was 0.3% at 35° C., 2.3% at 30° C., 6.3% at 20° C. and 17.2% at 10° C.

We claim:

1. In a process for the catalytic hydrogenation of an unsaturated fatty compound, the improvement which comprises using, as the catalyst, a finely dispersed nickel boride stabilised with a linear organic polymer, said catalyst being prepared by a process in which an at least partly dissolved nickel salt containing less than 6 molecules of crystal water in the presence of an at least partly dissolved polar linear polymer of vinylpyrrolidone is reduced with the aid of an alkali borohydride.

2. The process of claim 1 wherein the amount of catalyst used, calculated as nickel, is between 5 and 500 ppm.

3. A process as claimed in claim 2 wherein the amount of nickelboride catalyst is between 5 and 200 ppm.

4. A process as claimed in claim 3 wherein the cataylst is dispersed in a triglyceride.

5. A process as claimed in claim 4 wherein the unsaturated hydrocarbon which is hydrogenated is a triglyceride.

6. The process of claim 5 wherein the hydrogen pressure is between 100 and 500 kPa and the temperature is between 20° and 180° C.

7. The process of claim 6 wherein the polymer is polyvinylpyrrolidone.

* * * * *